(12) United States Patent
Birli et al.

(10) Patent No.: US 7,431,252 B2
(45) Date of Patent: Oct. 7, 2008

(54) THREADED ROD HANGER

(75) Inventors: Mary Ellen Birli, Maple Hts., OH (US);
Raymond Scott Laughlin, Middlefield, OH (US)

(73) Assignee: ERICO International Corporation, Solon, OH (US)

( * ) Notice: Subject to any disclaimer, the term of this patent is extended or adjusted under 35 U.S.C. 154(b) by 110 days.

(21) Appl. No.: 10/823,961

(22) Filed: Apr. 14, 2004

(65) Prior Publication Data
US 2005/0230582 A1   Oct. 20, 2005

(51) Int. Cl.
*A47B 96/00* (2006.01)

(52) U.S. Cl. .................. 248/221.11; 248/327

(58) Field of Classification Search ........... 248/229.11, 248/226.11, 228.1, 317, 327, 221.11, 222.11, 248/222.14; 403/164, 165, 397; 411/522, 411/523, 104
See application file for complete search history.

(56) References Cited

U.S. PATENT DOCUMENTS

| | | | |
|---|---|---|---|
| 2,364,880 A * | 12/1944 | Tinnerman | 411/527 |
| 3,341,909 A * | 9/1967 | Havener | 24/486 |
| 4,019,705 A * | 4/1977 | Habuda et al. | 248/58 |
| 4,214,667 A * | 7/1980 | Lass | 220/3.2 |
| 4,570,885 A * | 2/1986 | Heath | 248/72 |
| 5,667,181 A * | 9/1997 | van Leeuwen et al. | 248/343 |
| 5,947,424 A * | 9/1999 | Heath | 248/58 |
| 6,012,691 A * | 1/2000 | van Leeuwen et al. | 248/228.3 |
| 6,050,766 A | 4/2000 | Kies et al. | 411/437 |
| 6,672,545 B1 * | 1/2004 | Persing | 248/58 |

FOREIGN PATENT DOCUMENTS

EP   0 666 444 B1   9/1997   ................... 3/137

OTHER PUBLICATIONS

*ERICO Contractors Cost (CADDY® Fasteners)*, CF-44 Catalog, Effective Apr. 1, 1995.

* cited by examiner

*Primary Examiner*—A. Joseph Wujciak, III
(74) *Attorney, Agent, or Firm*—Renner, Otto, Boisselle & Sklar, LLP

(57) ABSTRACT

A rod hanger uses a spring insert clip horizontally insertable into a sheet metal housing to embrace and grip the threads of a vertical rod. The hanger has a sheet metal housing with parallel slots in opposite walls parallel to the rod. The clip has spring thread-form legs which are guided into the slots and held embracing the rod. The clip is U-shape with parallel legs which project from and snap behind one of the walls of the housing. The hanger may be in the form of a beam clamp or flange clip.

21 Claims, 2 Drawing Sheets

US 7,431,252 B2

THREADED ROD HANGER

DISCLOSURE

This invention relates generally as indicated to a threaded rod hanger and more particularly to a clip or clamp with a built in clasp or nut which need not be threaded on from the end of the rod, to enable the rod to be vertically positioned and held in place more easily and more quickly.

BACKGROUND OF THE INVENTION

Clamps and clips are often used as hangers for supporting and hanging a variety of items such as pipe, lighting and heating fixtures, cables or cable trays, for example, from a variety of structural members such as beams, struts, E-purlin, C-purlin, T-bars or other structural shapes.

Often the structure supported from the clip or clamp is by means of a threaded rod, and there may be a substantial vertical distance from the clamp or clip to the structure supported, and this distance may often vary from one clamp or clip to the next. The clamp or clip may be provided with a threaded hole or a thread form engaging the threads of the rod, and the rod is normally rotated to thread it through the hole or thread form. Since the vertical distance may be substantial (several feet or more) proper positioning of the rod may take many turns, even before a final precise adjustment is made. More importantly, rotating the rod by hand is a dull, tedious and time consuming job and the ultimate cost of any fastening system is measured by the time it takes to install. If a nut is employed it too is threaded from the end and may require many turns to achieve a final position. Moreover, adjustments with installations using a lock nut may be tedious because the lock nut has to be loosened and retightened every time an adjustment is made. With some installations precise vertical positioning is important, such as with drain pipe or suspended ceilings.

It would accordingly be advantageous to have a threaded rod clamp or clip system where the threaded rod can be positioned and secured more quickly and easily.

SUMMARY OF THE INVENTION

A rod hanger has a body adapted to be secured to a building structure and includes a passage for a vertically extending threaded rod normally offset from the structure. A removable spring clip snap fits horizontally into the body to embrace the rod and hold it in the selected vertical position.

The body includes a housing with the spring clip insertable in the housing. The clip has two thread form legs which are guided by parts of the housing closely to embrace the threaded rod, which guides also backup the thread form legs to maintain them in mesh with the threads of the rods. It is preferred that the housing be made of sheet metal from spring steel.

When the clip is fully inserted in the housing it is snap-locked in place beyond the far wall of the housing, with the tips projecting beyond the far wall of the housing. The clip may be repositioned by pressing the projecting tips together to release the snap-lock and removing the clip.

The housing may be integrally formed with or attached to a notched portion. In one form a screw clamp is provided for attaching the device as a clamp to a beam flange for example. In other forms the housing may integrally be formed with or attached to a drive-on or hammer-on or pull-on clip for attachment to a purlin or flange edge, for example.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENT

Figure 1:
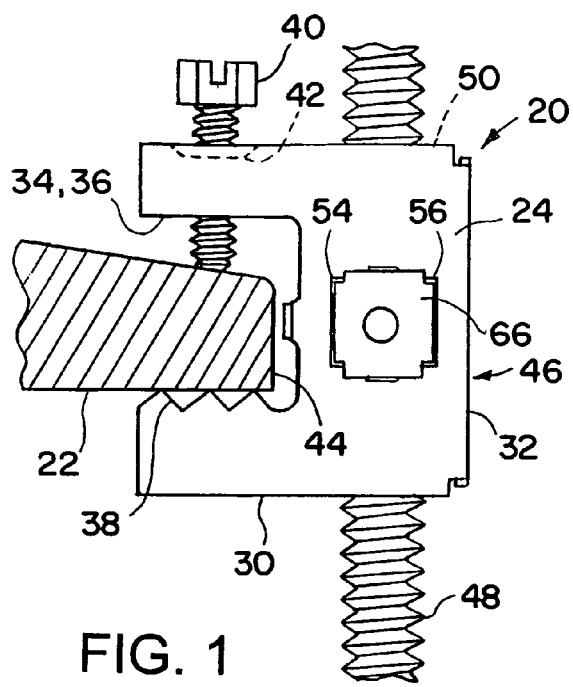
FIG. 1 is a fragmentary side elevation partially in section of a rod hanger in accordance with the present invention in the form of a clamp secured to a beam flange.
Figure 2:
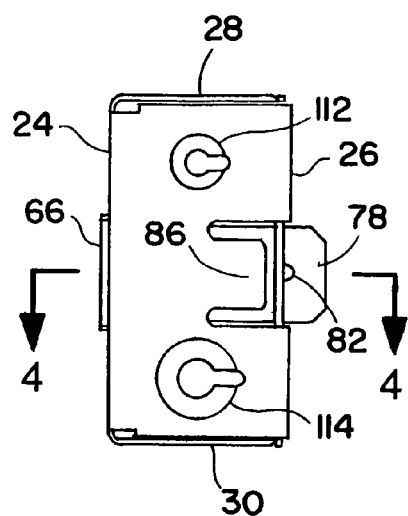
FIG. 2 is a side elevation of the hanger as seen from the right hand side of FIG. 1.

Referring initially to FIGS. 1-4 there is illustrated a rod hanger shown generally at 20 in the form of a clamp secured in FIG. 1 to the flange 22 of a beam or like structure. The hanger is made from sheet metal and includes side walls 24 and 26, top and bottom walls 28 and 30, respectively, and a rear wall 32. All of such walls may be made from a single sheet of spring steel with an extension folded or bent across the back to form the back wall.

In the clamp embodiment of FIG. 1 the side walls are each provided with a notch or cut-out seen as 34, 36, horizontally aligned, forming a jaw opening accommodating the beam flange 22. The notches are fairly substantial to accommodate a relatively thick flange 22 and the lower edge of the jaw openings may be serrated as indicated at 38.

The arms above and below the notches are simply formed from open ended channels formed by the sidewalls and top and the side walls and bottom, respectively.

A clamp screw 40 is threaded in a thread-form 42 in the top wall 28 which may be stamped in such wall, and by tightening the clamp screw down on flange 22 the clamp hanger is firmly secured to the flange.

It will be seen that most of the body of the clamp extends beyond the edge 44 of the flange 22 and forms a housing 46 for receiving vertically extending threaded rod 48. To facilitate receipt and movement of the rod the top wall is provided with a clearance hole 50 while the bottom wall is provided with a vertically aligned clearance hole 52 of the same size.

The side walls of the clamp hanger are each provided with a pair of vertically extending parallel slots seen at 54 and 56 in the wall 24 and 58 and 60 in the wall 26. The slots are also parallel to the axis 62 of the rod 48 and they are symmetrical about such axis.

Figure 3:
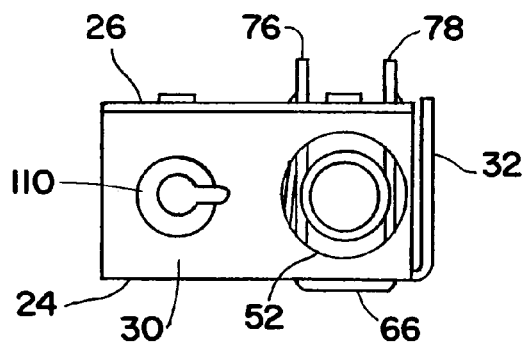
FIG. 3 is a bottom elevation of the hanger as seen from the bottom of FIG. 1.

Interfitting with such slots is a U-shape spring clip shown generally at 64. The clip includes a bight portion 66 and parallel spring legs 68 and 70, as seen more clearly in FIG. 4. Projecting inwardly from the legs are thread-form generally triangular sets of ridges 72 and 74. These thread-form ridges, and intermediate grooves extend for a substantial length on the inside of the legs acting to stiffen the legs to resist outward deflection or bowing. The ridges on opposite legs are offset axially of the rod one half the pitch of the rod threads, so that when inserted as shown in FIGS. 3 and 4, the ridges and alternating grooves will mesh with the threads of the rod.

When fully inserted the tips of the respective legs shown at 76 and 78 will project through the slots 58 and 60, in the opposite or far wall 26. The outside of each leg is provided with a small cam strike seen at 80 and 82 in FIGS. 2 and 4, each having a slope and an abutment which will snap over the outer side edges of the slots 58 and 60 and lock behind the respective edges, as seen in FIG. 4. The spring clip can only then be removed by pressing the projecting tips together so that the abutments clear the slot edges.

Figure 4:
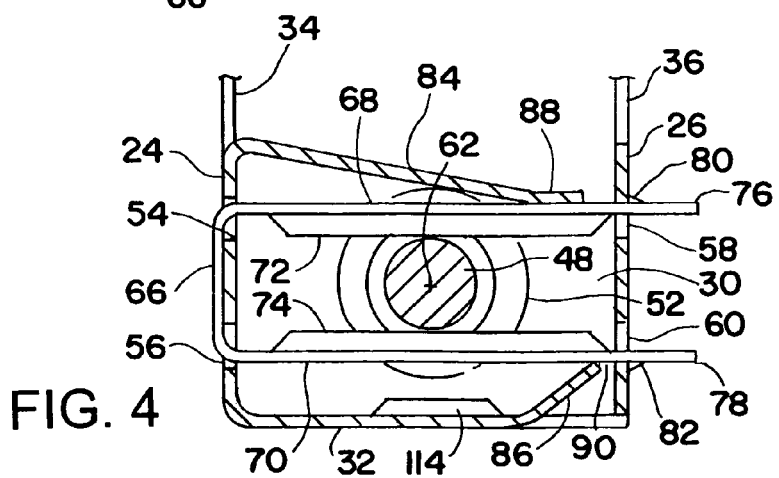
FIG. 4 is an enlarged fragmentary horizontal section taken substantially 4-4 of FIG. 2, and showing the spring clip fully inserted and snap-locked in place.

To facilitate the insertion of the clip and also to assist in holding the legs in place in mesh with the rod threads, the housing is provided with back-up guide arms seen at 84 and 86 most clearly in FIG. 4. The longer angled arm 84 is struck from the side wall 24 and includes a bent tip 88 at a lesser angle than the major extent and which bears against the outside of the clip leg about half way between the rod and the wall 26. This end portion of the arm guides the tip 76 into slot 58 and also acts as a back-up for the leg 68 to maintain clip leg and threaded rod in engagement.

The shorter arm 86 is struck from the wall 32 and extends at the acute angle shown so that the tip 90 will engage and guide the tip 78 of the leg 76 of the spring clip into slot 60. The sloping surface of both arms act as linear cams for this guiding purpose. The tip 90 also serves as a back-up for leg 70.

There is of course enough flexure in the spring legs so that the projecting tips 76 and 78 may be gripped between thumb and forefinger for example, to release the snap and remove the clip.

Figure 5:
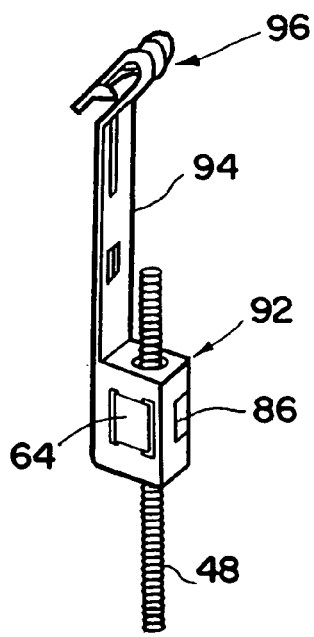
FIG. 5 is a perspective view of the rod hanger of the present invention in the form of a Z-purlin clip.
Figure 6:
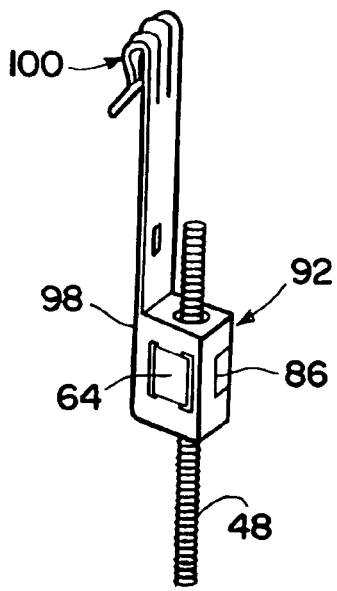
FIG. 6 is a similar view of an embodiment in the form of a C-purlin clip.
Figure 7:
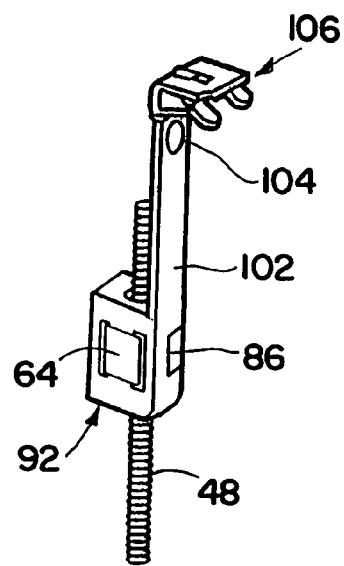
FIG. 7 is a view of an embodiment in the form of a hammer-on flange clip.

Referring now to FIGS. 5, 6, and 7, the rod hanger is shown as part of snap-on, pull-on, or hammer-on clip, respectively. The generally rectangular housing 92 for the rod engaging clip 64 is, in each embodiment, essentially the same. The wall of the housing facing the viewer is provided with the strike for forming arm 86 while the wall away from the viewer is provided with the longer guide arm. The top and bottom of the housing are provided with the clearance holes for the rod 48.

In FIG. 5 the far wall of the housing extends upwardly as shown at 94 and terminates in an angled U-shape clasp 96 designed to snap on the edge of a Z-purlin, for example.

In FIG. 6 the far wall 98 extends upwardly to terminate in a U-shape clasp 100 to snap on the flange of a C-purlin, for example. A difference between a Z-purlin and a C-purlin is normally that the bottom edge or flange of the former projects upwardly at an angle while the latter projects vertically.

In FIG. 7 the near wall of the housing 92 extends upwardly as seen at 102 and the top is secured by a fastener such as a rivet 104 to a U-shape hammer-on flange clip 106. The clip 106 may be struck by a hammer, for example to be secured to a horizontally projecting edge such as a beam or truss flange. Like the clip of FIG. 7, the clips of FIGS. 5 and 6 may also be hammered-on or pulled-on the structure flanges as described. Clips like those shown at the tops of the FIGS. 5-7 embodiments are made and sold by ERICO International Corporation of Solon, Ohio, U.S.A. under the trademark CADDY®.

Figure 8:
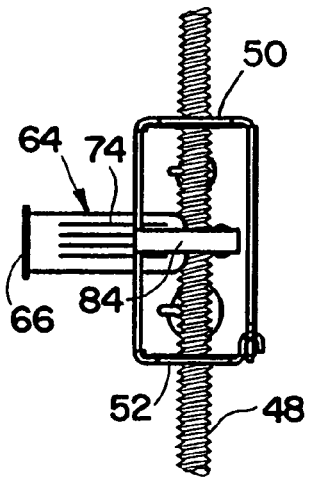
FIG. 8 is a sectional view of a hanger housing showing the clip partially inserted.
Figure 9:
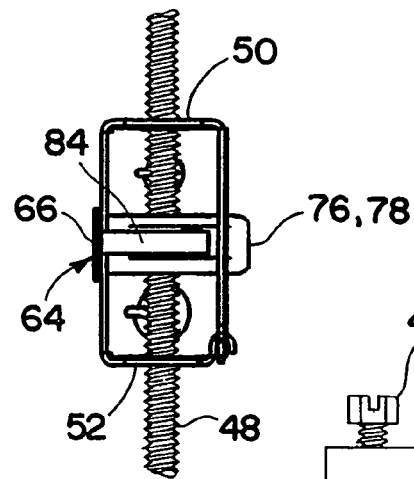
FIG. 9 is a similar section showing the clip fully inserted.

With reference to FIGS. 8 and 9, FIG. 8 illustrates the U-shape spring clip 64 being inserted in the parallel slots in one wall with the tips of the legs straddling the threaded rod 48. As the clip is pushed to its final position seen in FIG. 9 the tips 76 and 78 are guided through the parallel slots in the opposite wall to project as illustrated. The cam strikes on the outside of the legs snap behind the slot edges of the far wall as the bight portion of the clip seats against the near or opposite wall. When this happens the clip is snug and held against movement in either direction. As indicate the tips of the legs need to be pressed together before the clip can be released.

Referring back to FIG. 2, it will be seen that the bottom wall 30 is provided with a stamped thread form 110 while in FIG. 2 the rear wall 32 is provided with two thread forms shown at 112 and 114 with the one on the bottom being of a larger size.

Figure 10:
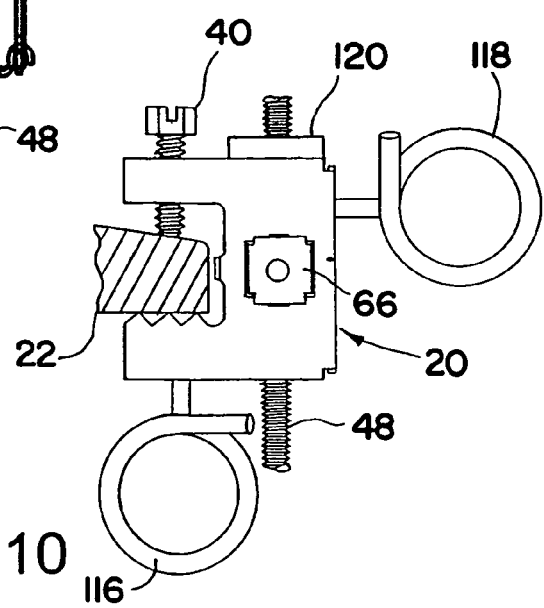
FIG. 10 is a view like FIG. 1 but with added intermediate fasteners and a lock nut on top of the rod.

As seen in FIG. 10 these thread forms enable a variety of other intermediate fasteners or supports to be mounted on the rod hanger housing. In FIG. 10 bridle rings are shown at 116 and 118 are mounted in the thread forms 110 and 112, respectively. These would typically support one or more runs of wiring or cable. Other supports or intermediate fasteners may also be secured to the beam flange 22 in the same manner, such as conduit clips, T-bar clips or clamps or chain, wire, or cable hangers or braces.

It is also noted that FIG. 10 illustrates a lock nut 120 on top of the housing threaded on the rod and tightened against the top of the housing. Although the lock nut may be a conventional nut or nut and washer, the illustrated nut is a slip-on nut such as shown in Applicants' Assignee's prior U.S. Pat. No. 6,050,766.

It can now be seen that there is provided a rod hanger formed with a simple sheet metal housing enabling a rod to be secured to the housing by insertion of a self locking spring clip laterally of the rod to engage, grip, and hold the rod at any desired vertical position. Final height adjustment can be made simply by rotating the rod. The hanger may be in the form of a beam clamp or one of several forms of a flange clip. With the rod hanger installations may more quickly be made and at lower cost.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

The invention claimed is:

1. A rod hanger comprising:
   a body adapted to be secured to a building structure, wherein the body includes a threaded rod receiving portion accommodating a vertically extending threaded rod therethrough generally clear of the building structure, and
   an insert clip in said rod receiving portion gripping the threaded rod to secure it in vertical position,
   wherein said rod receiving portion includes a sheet metal housing with slots in opposite side walls generally parallel to the rod to receive the insert clip,
   wherein said insert clip has a U-shape and has parallel spring legs each having a linear series of grooves forming a thread form profile in each leg,
   wherein the thread form profiles in the respective legs are offset from each other by one half the pitch of the threads of the rod, wherein said housing has angled projections to guide tips of the legs of the insert clip from one set of the slots to another set of the slots, and wherein said sheet metal housing includes aligned notches to receive a beam flange, and a clamp screw to clamp the hanger to said beam flange.

2. A hanger as set forth in claim 1 wherein the sheet metal housing includes a rear wall that is attached to both of the side walls.

3. A rod hanger comprising:

a body adapted to be secured to a building structure, wherein the body includes a threaded rod receiving portion accommodating a vertically extending threaded rod therethrough generally clear of the building structure, and an insert clip in said rod receiving portion gripping the threaded rod to secure it in vertical position, wherein said rod receiving portion includes a sheet metal housing with slots in opposite side walls generally parallel to the rod to receive the insert clip, wherein said insert clip has a U-shape and has parallel spring legs each having a linear series of grooves forming a thread form profile in each leg, wherein the thread form profiles in the respective legs are offset from each other by one half the pitch of the threads of the rod, wherein said housing has angled projections to guide tips of the legs of the insert clip from one set of the slots to another set of the slots, and wherein said sheet metal housing includes an extension terminating in an edge clip.

4. A hanger as set forth in claim 3 wherein said edge clip is angled with respect to the extension.

5. A hanger as set forth in claim 3 wherein said edge clip is generally parallel to said extension.

6. A hanger as set forth in claim 3 wherein said edge clip is generally perpendicular to said extension.

7. A threaded rod hanger comprising:

a sheet metal body, wherein the body includes a first portion adapted to be fixed to a building structure, and a rod receiving portion offset from the first portion accommodating a threaded rod vertically therethrough clear of the structure, and an insert clip in said rod receiving portion operative to grip the threaded rod to hold it in a selected vertical position, wherein said body includes opposite side walls generally parallel to the threaded rod, and parallel slots in said opposite side walls generally parallel to the rod to receive the insert clip, wherein said insert clip has a U-shape and has parallel spring legs each having a linear series of grooves forming a thread profile, wherein the profiles in the respective legs are offset from each other by one half the pitch of the threads of the rod, wherein said body has angled projections to guide tips of the legs from one set of the slots to another set of the slots, and wherein said sheet metal body includes aligned notches to receive a beam flange, and a clamp screw to clamp the hanger to said beam flange.

8. A hanger as set forth in claim 7 wherein said angled projections engage and back up said legs to hold the thread forms against the rod.

9. A hanger as set forth in claim 8 wherein the tips of the legs project through the slots of one wall when the insert clip is fully inserted in the slots of the other.

10. A hanger as set forth in claim 9 including projections on the outsides of said spring legs adapted to snap behind the slots in said one wall to lock the insert clip in place.

11. A threaded rod hanger comprising:

a sheet metal body, wherein the body includes a first portion adapted to be fixed to a building structure, and a rod receiving portion offset from the first portion accommodating a threaded rod vertically therethrough clear of the structure, and an insert clip in said rod receiving portion operative to grip the threaded rod to hold it in a selected vertical position, wherein said body includes opposite side walls generally parallel to the threaded rod, and parallel slots in said opposite side walls generally parallel to the rod to receive the insert clip, wherein said insert clip has a U-shape and has parallel spring legs each having a linear series of grooves forming a thread profile, wherein the profiles in the respective legs are offset from each other by one half the pitch of the threads of the rod, wherein said body has angled projections to guide tips of the legs from one set of the slots to another set of the slots, and wherein said body includes an extension terminating in an edge clip.

12. A hanger as set forth in claim 11 wherein said edge clip is angled with respect to the extension.

13. A hanger as set forth in claim 11 wherein said edge clip is generally parallel to said extension.

14. A hanger as set forth in claim 11 wherein said edge clip is generally perpendicular to said extension.

15. A rod hanger comprising:

a body adapted to be secured to a building structure, wherein the body includes a threaded rod receiving portion accommodating a vertically extending threaded rod therethrough generally clear of the building structure; and an insert clip in said rod receiving portion gripping the threaded rod to secure it in vertical position;

wherein said rod receiving portion includes a sheet metal housing with slots in opposite side walls generally parallel to the rod to receive the insert clip;

wherein said insert clip has a U-shape and has parallel spring legs each having a linear series of grooves forming a thread form profile in each leg;

wherein the thread form profiles in the respective legs are offset from each other by one half the pitch of the threads of the rod;

wherein said housing has angled projections to guide tips of the legs of the insert clip from one set of the slots to another set of the slots;

wherein the sheet metal housing includes a rear wall that is attached to both of the side walls;

wherein one of the angled projections is struck from the rear wall; and wherein the one of the angled projections extends from the rear wall at an acute angle.

16. A rod hanger as set forth in claim 15 wherein said angled projections engage and back up said legs to hold the thread form profiles against the rod.

17. A rod hanger as set forth in claim 16 wherein the tips of the legs project through the slots of one wall when the insert clip is fully inserted in the slots of the other.

18. A rod hanger as set forth in claim 17 including projections on the outsides of said spring legs adapted to snap behind the slots in said one wall to lock the insert clip in place.

19. A hanger as set forth in claim 15,
wherein another of the angled projections is struck from one of the side walls; and
wherein the another of the angled projections extends from the one of the side walls.

20. A hanger as set forth in claim 19,
wherein the another of the angled projections includes an angled arm and a tip bent relative to the arm; and
wherein the tip bears against one of the spring legs.

21. A rod hanger comprising:
a body adapted to be secured to a building structure, wherein the body includes a threaded rod receiving portion accommodating a vertically extending threaded rod therethrough generally clear of the building structure; and
an insert clip in said rod receiving portion gripping the threaded rod to secure it in vertical position;
wherein said rod receiving portion includes a sheet metal housing with slots in opposite side walls generally parallel to the rod to receive the insert clip;
wherein said insert clip has a U-shape and has parallel spring legs each having a linear series of grooves forming a thread form profile in each leg;
wherein the thread form profiles in the respective legs are offset from each other by one half the pitch of the threads of the rod;
wherein said housing has angled projections to guide tips of the legs of the insert clip from one set of the slots to another set of the slots;
wherein the sheet metal housing includes a rear wall that is attached to both of the side walls; and
wherein the rear wall has at least one thread form therein.

* * * * *